INVENTOR.
LEWIS BALAMUTH

1. LOW FREQUENCY
10-50 Kc/sec.

FIG. 2D

2. HI-FREQUENCY
1-5 mc/sec

FIG. 2E

3. VHF
10-500 mc/sec

FIG. 2F

INVENTOR.
LEWIS BALAMUTH
BY
Leonard W. Suroff
ATTORNEY

March 10, 1970 L. BALAMUTH 3,499,437
METHOD AND APPARATUS FOR TREATMENT OF ORGANIC
STRUCTURES AND SYSTEMS THEREOF
WITH ULTRASONIC ENERGY
Filed Sept. 11, 1967 4 Sheets-Sheet 4

INVENTOR.
LEWIS BALAMUTH

BY
Leonard W. Suroff
ATTORNEY

United States Patent Office 3,499,437
Patented Mar. 10, 1970

3,499,437
METHOD AND APPARATUS FOR TREATMENT OF ORGANIC STRUCTURES AND SYSTEMS THEREOF WITH ULTRASONIC ENERGY
Lewis Balamuth, New York, N.Y., assignor to Ultrasonic Systems, Inc., Farmingdale, N.Y., a corporation of Delaware
Continuation-in-part of application Ser. No. 622,126, Mar. 10, 1967. This application Sept. 11, 1967, Ser. No. 666,871
Int. Cl. A61h 1/00, 23/00
U.S. Cl. 128—24                              56 Claims

ABSTRACT OF THE DISCLOSURE

Application of ultrasonic energy to organic structures, and particularly humans, for therapeutic stimulation of the various systems, i.e., nervous, circulatory etc., with elastic coherent wave energy that is applied in pulses at relatively high repetition rate with the interval of time between each pulse as well as dosage and intensity, selected that the heat generated by a single pulse will be well dissipated before the application of the next pulse. In this way, the superficial body areas are treated, whereby the chief effects produced are those due to the coherent wave energy which the pulse gives to the tissue. The heat produced by absorption dissipates and there is no real thermal effect, such as a significant temperature rise in the tissue as is produced with high frequency vibrations at the same or similar frequency when applied in a continuous wave pattern.

---

The use of continuous and pulsed coherent elastic energy waves, generally in the ultrasonic frequency range, for treating the various systems of biological organisms, and particularly the nervous system in humans with mechanical vibrations which affect the nerve receptors involved in a manner to temporarily prevent their reaction to ordinary pain producing stimuli.

BACKGROUND OF THE INVENTION

This application is a continuation-in-part of my copending application Ser. No. 622,126 filed Mar. 10, 1967 and which application is incorporated herein by reference.

This invention relates generally to ultrasonic therapeutic treatment of organic structures with coherent elastic wave energy wherein the energy is applied at a relatively high repetition rate to the organic structure, and more particularly the treatment of humans to obtain a micromassage of the cellular structure comprising the various systems of the body for controlled stimulation thereof.

This invention also relates to the treatment of organic structures with coherent elastic energy waves to produce an analgesic effect of the treated area, and more particularly improved method and apparatus for treating the nerve receptors of the nervous system in a biological organism with coherent mechanical vibrational energy of high frequency and low amplitude for a period of time such that said nerve receptors are temporarily incapable of reacting to stimuli which would normally induce them into producing painful sensations.

In my copending patent application, referred to above, the basic invention of treating organic structures, such as humans and other animals, fish or plants, with coherent wave energy to obtain a micromassage of the cellular structure for therapeutic purposes is disclosed. My copending application teaches the use of so-called low ultrasonic frequency bands for which absorption is so low that thermal energy production which is the predominant event caused by high frequency ultrasonic waves in the body, is not generally a prohibitive factor. An underlying principle related to the present application is the fact that mechanical vibrations may be of two general kinds. One being the ordinary gross elastic vibrations of bodies or masses, which belong to what are called "coherent" vibrations or waves. Coherence means that the vibration of various parts of the wave are in definite phase relation in time with one another. By contrast, one has the incoherent or phase disconnected vibration to be found in solids and liquids and which, in general, comprise what is called the "thermal energy" of a body.

Most ultrasonic vibration of ultra high frequency (1,000,000 cycles per second and higher) are currently widely used for treatment of biological systems including medical therapy for humans. But, due to the high absorption coefficient of high frequency mechanical or elastic waves, the coherent wave energy is rapidly dissipated into thermal energy or heat and the effects produced are mainly due to temperature rise in the hard and soft tissues. In fact, medical ultrasonic therapy as practiced is severely limited by this thermal effect. The dosage of energy must be maintained low enough so that dangerous temperature rises will not occur in vital tissue and organs. In this way the amount of coherent wave energy available for treatment purposes is very small.

GENERAL THERAPEUTIC TREATMENT

Applicant has discovered methods and apparatus for still further limiting thermal effects and therefore allow both the use of higher frequencies in excess of 1,000,000 cycles per second, and higher intensities of coherent elastic waves than heretofore used. In pioneering work in the periodontal and prophylaxis dental fields, applicant has participated and aided in the design of instruments with bent tips as disclosed in U.S. Patent No. 2,990,616, such that the microscopic output vibration of the tool are elliptical in character. This not only lowered friction, when pushing such tools down between gingival tissue and root surfaces of teeth, but also because of the high acceleration involved the tool tip during each cycle of vibration would spend only a small part of the time in contact with either tooth or gum. Therefore, a "resting" time is provided during each oscillation, which increases patient comfort.

Applicant has now established that the equivalent of such "resting times" may be realized in another fashion for other kinds of wave energy therapy for both sonic (500 to 16,000 c.p.s.), low ultrasonic (16,000 to 600,000 c.p.s.), and high ultrasonic (600,000 to 10,000,000 c.p.s. and higher) frequency ranges. By placing a vibrator in, say, the tank circuit of an amplifier it is possible to generate "bursts" or "bunches" of vibrations at the resonant frequency of the transducer being used. This is easily accomplished by one skilled in the art as by merely keying the oscillator or electronic means being used to feed energy to the transducer. The keying may be mechanical, such as a rotatory switch, or it may be some type of electronic switching means, or simple relay devices. The point is, that it is readily possible to design the system so as to pre-select the length of time of the "burst" or "pulse," and also the length of the resting time between bursts.

For example, in superficial types of treatment such as with hair, ointments, skin disorders and the like, it is possible to use very high ultrasonic frequencies which will not penetrate very deeply without absorption. The heat generated by a single pulse will be well dissipated if the waiting time for the next pulse is long enough. In this way, the superficial body areas may be treated with special applicators, whereby the chief effects produced are those due to the coherent wave energy which the pulse gives to the tissue. The heat produced by absorption dissipates and here there is no real thermal effect, such as a significant temperature rise in the tissue. For example, consider 60 bunches per second switching to 1 mc. waves where the tank Q of the amplifier allows, say 100 complete oscillations to one bunch of resonant vibrations.

In this case the resting time is 170 times greater than the treatment time and therefore considerable intensity of wave energizing may be contained in a "pulse" or "burst," which at the tissue could tolerate if the wave treatment were continuous. We have here a kind of magic ultrasonic bullet, which may be directed for a tremendous variety of purposes into biological structures some of which have been disclosed in applicant's parent application. It is to be understood that the variety of applicator which may be employed for ultrasonic treatment by my method is extraordinarily great, and also the ratio of "resting time" to "treatment time" may be infinitely varied. For the treatment of a given condition, a frequency and intensity is selected that is compatible with the portion being treated.

ANALGESIC THERAPEUTIC TREATMENT

Applicant has discovered methods and apparatus for applying coherent elastic energy waves in the frequency range of 500 c.p.s. to at least 10 mc./sec. for the treatment of the nervous system of a biological organism to produce analgesic effects therein. The path of waves may be of a continuous or pulsed wave pattern which when properly transmitted to the selected portion of the biological organism in accordance with the present invention, and particularly the nerve receptors of the nervous system thereof, are capable of inducing non-responsiveness therein to pain stimuli which would normally cause a direct body reaction thereto.

By employing ultrasonic vibrations it is possible to put considerable quantities of coherent wave energy into biological systems without a significant temperature rise. This means that, looking at any small part of a biological organism, say a nerve receptor, the passing of the elastic wave causes a rapid oscillation of compression and tension stresses in the structure. This results in a "micromassage" which has a beneficial action on the general tonus of the treated cells and under controlled intensities and dosages may be applied as an analgesic agent to portions of the nervous system to produce temporary analgesia of the treated nerve receptors.

OBJECTIVES OF THE INVENTION GENERAL THERAPEUTIC

An object of the present invention is to provide a method and apparatus for the treatment of organic structures with coherent elastic energy waves that are applied at a relatively high repetition rate to put considerable quantities of coherent elastic wave energy into the structure without significantly increasing the temperature therein.

Another object of the present invention is to provide a method and apparatus for irradiating an organic structure with pulsed coherent elastic energy waves which is selected so that the variable factors of frequency, intensity and duration of treatment or dosage are selected for ranges to produce a micromassage of the cells therein without the development of excessive heat thereof.

A further object of the present invention is to provide a method and apparatus for ultrasonically treating humans and other animals as well as plants with pulsed vibrations at dosages that are safe for their treatment and which produce beneficial effects therein.

Another object of the present invention is to provide a method of treating a biological system without severely limiting the movement of the system during its irradiation with pulsed coherent wave energy.

Yet another object of the present invention is the treatment of plants and animals with pulsed coherent elastic vibrations to increase their growth rate.

A further object of the present invention is the treatment of a biological organism with coherent wave energy applied at two frequencies of vibration, which energy is applied either pulsed, continuous or combinations thereof.

Still another object of the present invention is the treatment of the various body systems and other portions of a human consisting of the hair, skin, bones, muscles, brain, nerves, sensory, digestive, circulatory, respiratory, excretory and reproductive.

ANALGESIC THERAPEUTIC TREATMENT

An object of the present invention is to provide a method and apparatus for the treatment of organic structures with coherent elastic energy waves to act as an analgesic.

Another object of the present invention is to provide a method and apparatus for the treatment of nerve receptors with coherent elastic energy waves at selected ultrasonic frequencies and periods of time for producing non-responsiveness and thereby an inability to react to ordinary pain producing stimuli.

A further object of the present invention is to provide a method for ultrasonically treating living nerve cells of humans and other animals at energy levels and for periods of time to obtain localized desensitization to pain without any lasting harmful effects on the treated area.

A still further object of the present invention is to provide a method of treating the nerves associated with teeth in a manner to anesthetize them for a period of time sufficient to permit normal dental procedures to be carried on without the need for a supplementary analgesic.

Yet another object of the present invention is to provide a method and apparatus for temporarily inducing non-responsiveness to stimuli in one or more of the basic nerve complexes or centers of the human body namely, i.e. the cerebral cortex, the spinal cortex and the solar plexis.

Yet a further object of the present invention is to provide a method and apparatus for the treatment of the pain center of animals in slaughter houses so that the animal's pain producing stimuli are not acted upon by the pain center during the slaughtering process.

Still yet a further object of the present invention is the method and apparatus for first treating the living cells of a biological structure with dosages of continuous or pulsed coherent wave energy to "deaden" the sensation of pain in the nerve tissue so as to permit the application of an analgesic agent (i.e. biochemical or pharmaceutical) for the purpose of continued control of pain.

Another object of the present invention is to provide a method and apparatus for irradiating nerve cells with continuous or pulsed coherent wave energy to obtain a micromassage of the cells to obtain a fatigue thereof which results in an analgesic effect therein without the development of excessive heat thereof.

A further object of the present invention is to provide a method and apparatus for ultrasonically treating human nerve centers at energy levels that are safe for their treatment.

A still further object of the present invention is to provide a method and apparatus for treating large portions of the human nervous system with ultrasonic vibrations without endangering the nervous system by possibly increasing the temperature level of the treated portion.

THERAPEUTIC TREATMENT OF CIRCULATORY SYSTEM

An object of the present invention is to provide a method and apparatus for the treatment of the circulatory system of organic structures and particularly humans, with coherent elastic energy waves to produce beneficial changes thereto.

Another object of the present invention is to provide a method to treat the blood circulating within the system in a manner to alter the viscosity of it to permit an easier flow through restricted areas of the body including the heart, arteries, veins and capillaries.

Yet another object of the present invention is to provide a method of treatment of acute phases of coronary heart disease by altering the viscosity of the blood as it circulates through the heart and surrounding arteries.

A further object of the present invention is to provide a method of treatment of various diseases of the blood by applying proper doses of coherent elastic energy waves at selected frequencies and intensities.

THERAPEUTIC TREATMENT OF HAIR AND SCALP

An object of the present invention is to provide a method and apparatus for the treatment of the hair and scalp of humans, with coherent elastic energy waves to produce beneficial treatment thereof.

Another object of the present invention is to provide a method and apparatus for treating human hair on the scalp to promote its growth.

Other objects and advantages of this invention will become apparent as the disclosure proceeds.

BRIEF DESCRIPTION OF THE VIEWS OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, in which similar reference characters refer to similar elements throughout the several views of the drawings:

DETAILED DESCRIPTIONS OF THE DRAWINGS

Figure 1:
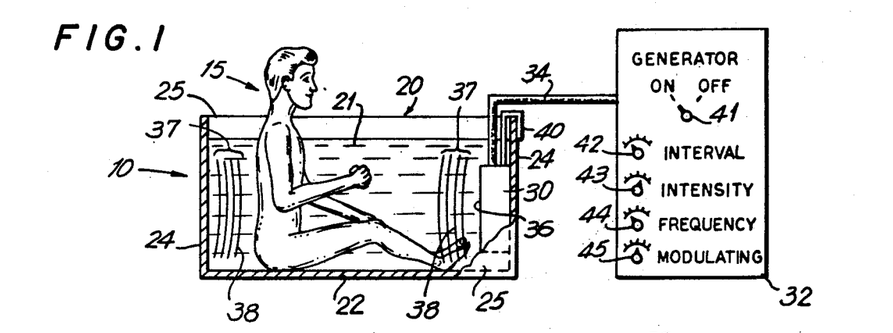
FIG. 1 shows in somewhat schematic form apparatus for treating an organic structure, such as a human, with pulsed coherent elastic energy waves.

Referring to the drawings in detail, and initially to FIG. 1 thereof, it will be seen that an apparatus 10 for treating an organic structure or biological system 15, for example a human, may include support means 20 in the form of an acoustic auditorium or enclosure within which the organic structure 15 is positioned to be treated by a path of coherent elastic wave energy. Since this invention permits the treatment of a wide range of organisms from the microscopic to the macroscopic, the size, shape and construction of the acoustic auditorium 20 will vary. The physical characteristics of the acoustic auditorium are also related to the properties of the elastic medium 21 through which the acoustic energy is transmitted. If the elastic medium 21 is a liquid, such as water, then the acoustic auditorium may be in the form of a bathtub or rectangular tank having a bottom 22 and a pair of upright side walls 24 and front and rear walls 25. If the fluid medium is in the form of a gas or vapor then the acoustic auditorium need merely have means for confining or supporting the organic structure. One of the spaced apart walls 24 may act as a reflector surface so that the elastic energy waves passing through the organic structure 15 are reflected for multiple treatment of the organic structure.

The ultrasonic elastic waves of a compressional wave form are produced by a transducer 30 which is energized by an oscillation generator 32, with a power cable 34 connecting the two together. The generator 32 is an oscillator adapted to produce electrical energy having an ultrasonic frequency which for the purposes of this invention is defined between the approximate range of 500 c.p.s. to 10 mc./sec. The transducer 30 may be one of a variety of electro mechanical types, such as electrodynamic, piezoelectric, magnetostrictive or hydrodynamic. The hydrodynamic type needs a compressor and is entirely mechanical except for a motor to run the compressor. The operating frequency may be in the higher sonic or ultrasonic ranges, when treating humans.

Preferably the transducer 30 and generator 32 may be operated at both a fixed frequency or modulated over a defined frequency range. The specific oscillation generator 32 and transducer 30 for accomplishing the result may be conventional, and as such, a detailed description thereof need not be included in this disclosure since it is known to those skilled in the art. The transducer 30 which may be of the hand held type for certain applications, has a vibratory output surface or biosonic wall 36 which is immersed in the elastic medium 21 and when energized will transmit a path 37 consisting of a series of coherent elastic energy waves 38 through the elastic medium 21 and into the human 15. Support means 40 in the form of a bracket is provided to support the transducer in the tank 20.

The generator 32 is provided with a series of control means to permit the operator of the equipment to properly select the controlled conditions under which the selected portion of the human is to be treated. "ON AND OFF" switching means 41 permits the current from generally a 60 cycle soure (not shown) to energize the generator 32. In practice the "FREQUENCY" control means 44 is adjusted to a desired frequency in conjunction with the "INTENSITY" control means 43 for the power and "INTERVAL" control means 42 for the time duration between and of each pulse. If desired the frequency may be modulated within a given frequency range by adjusting the "MODULATING" control means 45. The above control equipment is well known in the art and a detailed description thereof is not required.

The frequency modulation of the pulsed elastic waves 38 is important, as hereinafter explained in detail in the theory, in that by varying the frequency over a defined range and wave length band the settling of permanent foci of energy is prevented. At the same time this permits the generation of effects due to possible resonances in the organic system. This is highly desirable when treating biological systems of a complex nature to obtain a sufficient stimulation of a variety of the body organisms that have different acoustical characteristics.

As seen in FIG. 1 the human is placed in a path 37 of coherent wave energy, such as in spaced relationship to the biosonic wall 36 and in spaced relationship to the opposite side wall 24. The opposite side wall 24 for certain frequencies acts as an acoustic reflector so that the path 37 of pulsed energy waves 38 move along a generally linear path that pass through the human 15 and are reflected and again are transmitted through the elastic medium 21 and human 15. The human may enter the tank prior or subsequent to the biosonic wall 36 being vibrated. The duration of the treatment will be dependent upon the portion of the body requiring the stimulation or micromassage.

THEORY OF PRESENT INVENTION

Whereas a scientific explanation of the theory based on observation of the phenomena involved is disclosed below, it is to be clearly understood that the invention is by no means limited by any such scientific explanation.

GENERAL THERAPEUTIC TREATMENT

Figure 2A:
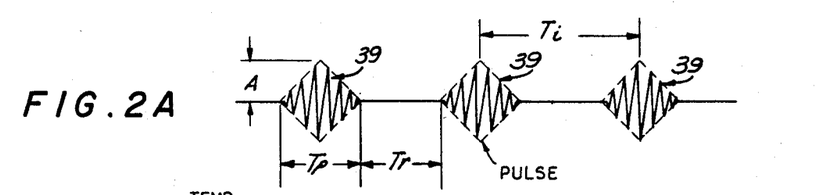
FIG. 2A illustrates schematically the pulses of coherent wave energy with the time intervals between each pulse.
Figure 2B:
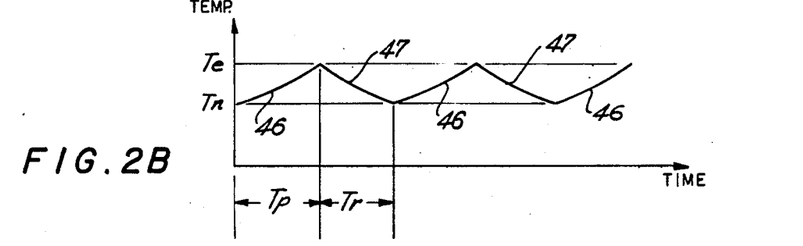
FIG. 2B is a chart showing the temperature variations in the treated cellular structure as plotted with respect to the energy pulses applied thereto.

The theory of the present invention is initially explained with respect to FIGS. 2A and 2B for the treatment of biological organisms with pulsed coherent wave energy. When the oscillation generator 32 is energized the output surface 36 will create a series of pulsed coherent elastic energy waves 38 in accordance with the control means on the generator. These waves are coupled through an elastic medium 21 to the organic structure 15.

If we consider sound in its travel let us consider each blood vessel, fatty deposit, tendon, muscle fibre and each interlying film of fluid as individual targets, against whose wave lengths the sound waves must first impinge before they can penetrate. Sound waves which are longer in dimension than the target which they strike have a tendency to either wrap around or penetrate the target with little or no reflection. This indicates that there will be little or no deposit of heat within the tissue where long waves are used, for example in the range of 16,000 c.p.s. to 100,000 c.p.s. for humans.

Conversely, a sound wave whose wave length is shorter than the linear dimension of the target which it strikes will not penetrate so readily, because of the inefficient coupling at each interface formed where two different substances lie one against the other. A portion of the wave will be reflected back from each interface and will subsequently convert to heat at the point of reflection. Thus, the higher the frequency which may be used in ultrasonic therapy the less penetration will be had and the greater will be the heat deposits within the tissue which is penetrated.

Applicant has now discovered that by pulsing the elastic wave energy the equivalent of resting times may be realized and that the heat produced by absorption dissipates between bursts, such that there is no real thermal effect and no significant temperature rise in the tissue.

It is to be understood that the variety of applicator which may be employed for ultrasonic treatment by my method is extra-ordinarily great, and also the ratio of "resting time" to "treatment time" may be infinitely varied.

For the treatment of a given condition, a ratio is selected. The ratio may be expressed as $$Tm/N \cdot Tt$$

$Tm$ = resting time
$Tt$ = period of vibration of treatment head or biosonic wall member
$N$ = number of oscillations per pulse.

The frequency and intensity of the vibration during $Tt$ determines the dosage in each pulse.

The pulse generator 32 may operate at a repetition rate of, say, about 50 to 100 pulses per second, each pulse being of multi-microsecond duration and consisting of say one 100 complete oscillations per pulse. Whereby a relatively long interval time for heat dissipation or resting exists between successive pulses. In practice, the duration of each pulse may be in the order of five milliseconds or even shorter.

In actual practice, a unit may be used having a pulse repetition rate of 100 pulses per second, with a pulse duration of about twenty microseconds at two megacycles. Thus, it is possible to go to higher frequencies where normally heat buildup is so great as to call for very low intensities and frequencies. Before this invention, the treatment of 600,000 cycles represented the safe upper frequency limit for certain applications to obtain micromassaging, it is now possible to go as high as ten megacycles with the pulsing method.

With respect to FIG. 1, generally speaking, the control means is adjusted in such a manner as to create and transmit from the output surface 36 a path 37 of a series of waves 38 that are applied for micromassaging the cellular structure of a portion of the organic structure being treated. The elastic wave energy is selected at a frequency and intensity compatible with at least the portion being treated so that the elastic wave energy penetrates pervasively into the acoustically accessible inner region thereof to obtain the micromassaging therapeutic treatment.

The coherent wave energy being transmitted is pulsed in a preselected pattern of pulses at spaced intervals of time to provide successive doses of energy to the cellular structure comprising the organic structure. The interval control means 42 is adjusted to obtain the desired pulsed sequence.

The pulsing cycle will vary with the frequency and intensity selected to treat the organic structure. For certain frequencies in the range of approximately 500 c.p.s. to 600,000 c.p.s. the pulsed elastic wave energy 38 has a frequency characterized in that when penetrating and traversing the organic structure 15, a minimal quantity of the wave is reflected and dissipated in the form of heat within the organic structure. Since heating is not of primary concern in this range of 500 c.p.s. to 600,000 c.p.s. the spaced time intervals are selected in relation to the time duration and intensity to provide a resting period for the cellular structure between successive doses of the pulsed energy. The resting period permits a micromassage treatment without over straining and possibly damaging the cellular structure in the portion of the body selected to be treated.

The organic structure contains a fluid medium which is either part of the cellular structure or in surrounding relation thereto, accordingly, depending on the purpose of the therapeutic treatment, the pulsed elastic wave energy is maintained at a level of intensity below the cavitational threshold of the fluid medium within the cellular structure to prevent any permanent damage thereto.

In contrast, for certain applications the frequency and intensity is selected at a level that would normally cause cavitation but the duration of each pulse only causes a momentary heating of the cellular structure and no permanent damage.

For treatment practices at higher frequencies, in the range of approximately 1 mc./sec. to 10 mc./sec., the path 37 has a frequency characterized in that when penetrating and traversing the organic structure there is a partial conversion of the pulsed coherent wave energy into thermal energy which conversion results in an elevation of the temperature of the treated cellular structure. In this range, of approximately 1 mc./sec. to 10 mc./sec., the time intervals between the successive pulses is selected to be of a duration to permit a dissipation of the heat buildup within the treated cellular structure during the previously applied energy pulse so that the body temperature of the treated area remains substantially at a constant level during treatment.

As an illustration of pulsing, reference is made to FIG. 2A, showing a sequence of pulses 39, each of which is made up of a high frequency signal burst having a selected amplitude A and duration $Tp$, and having time intervals $Tr$ therebetween, in predetermined relationship. The time between peak intervals being $Ti$. The relationship between $Tp$ and $Tr$ will vary for each application and depending upon whether the pulsing is used primarily for permitting the cells to rest between each pulse or the dissipation of the heat produced therein as well.

Applicant has already pointed out how high frequency ultrasound (megacycle range) produces its effect chiefly through absorption of the mechanical vibrations with consequent transformation from coherent wave energy into incoherent or random vibrations which appear in the body as temperature raising means. This whole question of maintaining coherency in mechanical vibrational energy, upon application to an organic structure is a question of selection of the proper frequency band as well as intensity.

To be sure, as one approaches the problem of treating the superficial areas of a body it is then possible to apply significant amounts of even high frequency energy (megacycle range) as coherent energy. The main variable factors of importance are frequency, $f$, intensity, $I$, and duration of treatment or dosage, $d$. The ranges for these factors to produce desired results vary with the area and object being treated. We can use the symbol $fId$ as the frequency, intensity, dosage property of a given treatment.

The frequency, $f$, is selected to be compatible with at least the portion treated, and $I$, represents the intensity and $d$, represents the total dose for a given treatment period with the relationship resulting in a micromassaging of the cellular structure of the treated portion as the energy waves penetrate pervasively into the acoustically accessable inner region thereof.

The pulsing may also be employed in addition to the modulation of such energy by using the continuous ultrasonic wave as a carrier beam of sonic patterns of various kinds. By projecting series of pulses we really form bunches of coherent wave energy (covering a frequency band) to provide successive doses of energy to the cellular structure. In addition to the coherent wave energy frequency band, we now have to select the pulsing frequency which may be anywhere from very low (subsonic) to well up into the sonic and even ultrasonic range (for very high pulse frequency band).

With pulsing, it is possible to consider very high coherent wave intensities, which could not be safely sustained continuously by a body, but which, with adequate pulse resting time could be safely applied. This "pulsing" aspect of coherent wave energy therapy corresponds to a kind of "shock treatment" when very powerful pulses are considered. The time length of the pulse determines the "dosage" per pulse when taken together with the intensity of the pulse. The time gap between pulses is the "rest time" between "shocks."

The interval of pulsing is selected so that the time between pulses over a total treatment time does not materially increase the temperature of the treated area. As seen in FIG. 2B, the individual impulses are plotted on the time co-ordinate and the temperature is plotted on the opposite co-ordinate.

During a single pulse corresponding to the time $Tp$ in FIG. 2B there is an increase in the treated cellular structure from the normal body temperature $Tn$ to an increased or elevated temperature $Te$ by the treatment dose of coherent energy. This increase in temperature occurs substantially during the transmission time $Tp$, and is illustrated by line 46 on the graph. The dwell or resting time interval is selected so that the elevated temperature, $Te$, may decrease to the normal temperature, along line 47 during the period of rest $Tr$, so that the body temperature returns substantially to normal prior to the next pulse of energy.

For those applications in the low frequency range pulsing is employed for the purpose of permitting the cells a "rest period" during a treatment session. The benefits of micromassage on the cells may be enhanced by introducing rest periods even though internal heating is not a major factor.

Figure 2C:
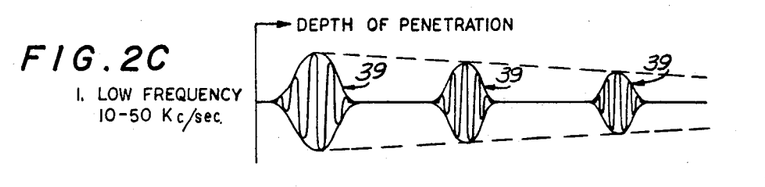
FIGS. 2C, 2D and 2E illustrate the pattern and depth of penetration of the path of pulsed coherent wave energy as it enters and travels through the organic structure at various frequency ranges.
Figure 2D:
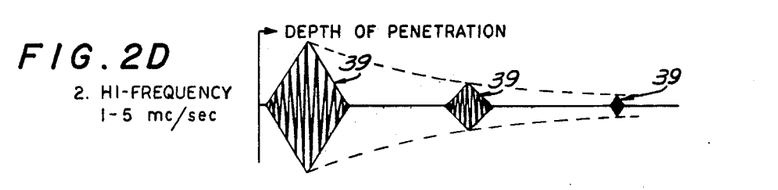
Figure 2E:
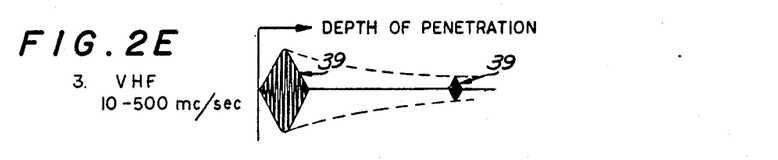

FIGS. 2C, 2D and 2E illustrate the depth of penetration within an organic structure of pulsed coherent elastic energy waves as they are propagated along a path within the organic structure. The organic structure acts as the absorptive medium and the spacing between the pulses 39 is the rest time between pulses. The mid-frequency band of the pulse determines how fast the pulse intensity diminishes with distance from the source for a given structure. To illustrate this concept we have FIGS. 2C, 2D and 2E illustrates the absorption for the very high frequency range of 10 kc. to 50 kc. where there is very little alteration in the homogeneous tissue. FIG. 2D shows the pulses 39 for a frequency in the range of one megacycle per sec. to 5 megacycles per sec. which is a frequency range in which there is greater degree of heat producing effect even though coherent energy is still present and proportional to the vibration amplitude at that point. FIG 2E illustrates the absorption for the very high frequency of 10 megacycles per sec. to 500 megacycles per sec. in which there is high attenuation for effectively superficial action.

The exact values for distances traveled above depends on the magnitude of the absorption coefficient. Once the coefficient of absorption is known then the rate of decay of the pulse may be computed. Applicant's invention permits using high absorption coefficient pulses and still getting coherent waves energy effects, by lightening the heating effect with suitable "rest times" between pulses.

Figure 2F:
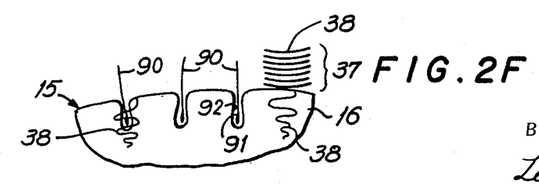
FIG. 2F is a schematic illustration of the elastic wave in its micromassage treatment of the hair roots of a biological organism.

FIG. 2F is a schematic illustration of proposed theory of treatment of the hair 90 and scalp of a human 15 by placing the area 16 to be treated in a path 37 of coherent wave energy 38 which may be propagated through the air or some other elastic medium. The hair root 91 extends up through the hair follicle 92 and which entire length is treated by the propagating wave path 37 as it passes through the scalp and is dissipated therein.

ANALGESIC TREATMENT

Now it follows from the great qualitative difference of behavior to external stimuli of such systems in the body as muscle, blood, and nerve, etc. that it is possible to produce quite different effects with the same kind of coherent wave energy applied continuously or intermittently. Accordingly it is possible, for example, to affect a nerve threshold without doing any such thing for muscle or blood since they operate on different principles. In this respect there is a whole complex inter-relationship of the utmost importance in employing the use of coherent wave energy to benefit an organism.

In addition to the above there are at least three other basic systems of importance in the body that may be treated. They are the bony skeletal structure, the lymph gland system and the endocrine (ductless) gland system, and the system of organs involved in the ordinary chemical factory of digestion and elimination. These include the sweat glands, the colon and small intestines, the lungs, the stomach, the kidneys, the liver, the gall bladder, etc.

With respect to the nervous system of the body we know that this one operates on a binary number system base. That is, a nerve receptor either fires or it doesn't. Below a certain threshold, no effect, above this threshold the nerve responds. Hence, the only way to affect a nerve response is to alter the threshold of firing. In accordance with the invention the coherent-energy-stimulated nerve tissue, through a kind of fatigue effect, develops an increased threshold of response. Therefore, a stimulus which would ordinarily "fire" the nerve receptors, will not do so for the "treated" tissue.

Figure 3A:
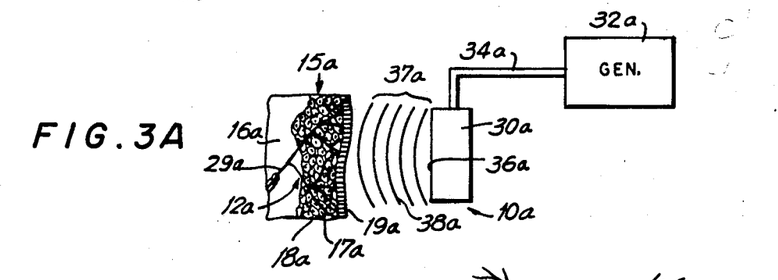
FIG. 3A is an enlarged section of a portion of the human anatomy showing the wave front for irradiating the nerve receptors of the nervous system to obtain an analgesic treatment thereof.
Figures 3B, 9, 10:
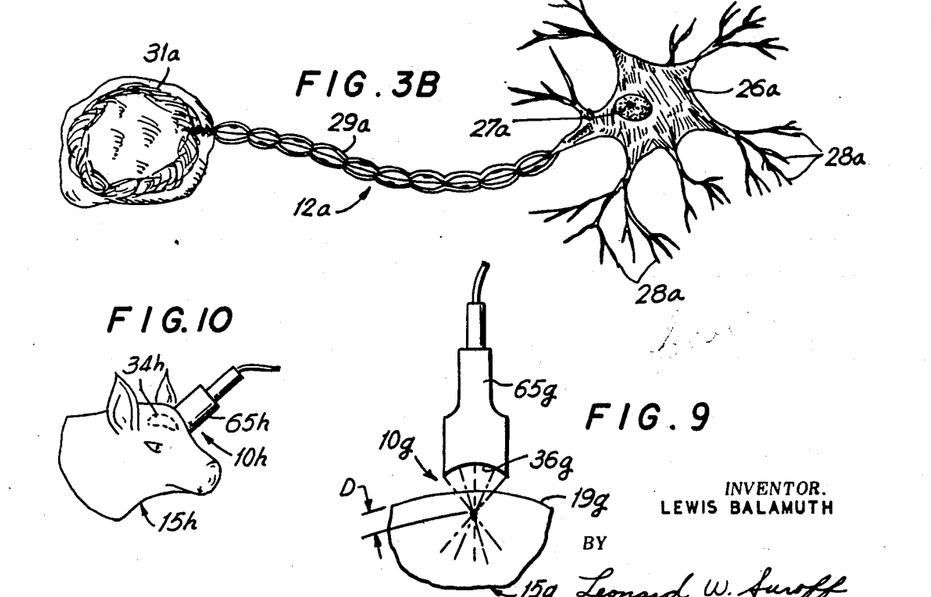
FIG. 3B is a greatly enlarged schematic representation of a nerve cell and associated parts of the nervous system.
FIG. 9 illustrates the control of penetration of the path of energy by focusing the energy.
FIG. 10 illustrates the invention as it applies to animal slaughter to render the animal insensitive to pain.

Referring to FIGS. 3A and 3B which illustrate the theory of the present invention 10a with respect to the nervous system 12a, FIG. 3A is an enlarged portion 16a of the biological organism 15a such as the human anatomy, composed of a series of cellular structures 17a containing a fluid medium 18a therebetween and terminating in an outer layer of cells referred to as the tissue or skin 19a.

FIG. 3B is an enlarged portion of a nerve receptor or cell 26a which is part of the nervous system 12a contained in FIG. 3A and which is described in a simplified manner to illustrate the theory of the present invention. Nerve cells 26a also called neurons, are especially constructed so as to carry nerve impulses from one part of the body to another. Nerve impulses are actually small amounts of electricity which are conducted by the nerve tissue. Each neuron 26a has a central portion, or cell body, that has a nucleus 27a, cytoplasm and a cell membrane (not shown). From one side of the cell body there extend very slender branching threads of protoplasm and these tiny nerve fibers are called dendrites 28a. From the other side of the cell body there extends a fairly thick nerve fiber, surrounded by a fatty sheath which ends in slender, branching threads of protoplasm. These nerve fibers are called axons 29a. Some axons are very short, while others are as much as three feet long. Dendrites 28a conduct the nerve impulses to the cell body 27a and the axons 29a carry impulses away from the cell body 27a to a nerve center 31a of the nervous system 12a.

Nerve tissue is made up of a series of neurons 26a or complex arranged so that the branching threads of protoplasm of an axon 29a intermingle with the dendrites 28a of the neighboring neuron. However, the two sets of branches do not actually touch. The gap between the branches is called a synapse. When an impulse moves along a nerve, it must jump across the synapse between one neuron and its neighbor. The term "nerve receptor" as used herein is intended to include not only the entire nervous system but individual portions thereof including but not limited to the nerve cell, neuron, nucleus, cell membrane, dendrites, axon and nerve centers of the biological organism.

Nerves are divided into two kinds: sensory nerves that carry impulses from sense organs to the brain, and motor nerves that carry command impulses to the muscles.

The theory of the present invention is that properly applied high frequency mechanical vibrations will cause, through the highly repetitive mechanical micromassage of the nerve receptors 26a involved a fatiguing of such nerves and dendrites 22 and thereby an inability to react to ordinary producing stimuli of the skin. This temporary or prolonged analgesis of the nerve receptors 26a is of fundamental importance since it may apply to all painful experiences, which is directly attributable to the transmitters or axons 29a to the appropriate nerve centers 31a in the body 15a. In case of humans the nerve centers 31a which can be treated include the cerebral cortex (in the brain), the spinal cortex of nerves which controls reflexes and movements of the body and the solar plexis of nerves, which is intimately related to the emotional reactions of the organism.

To induce the non-responsiveness or analgesia to pain stimuli the nerve receptors are placed in a path 37a of coherent high frequency acoustic energy and irradiated for the purpose of micromassaging and inducing a temporary fatigueing of the nerve receptors. The energy penetrates pervasively and irradiates the nerve receptors to obtain the temporary "exhaustion" thereof. The frequency and intensity is selected to be compatible with the nerve receptors treated. The irradiating consists of coherent mechanical vibrational energy of a high frequency, in the range of 500 c.p.s. to 600,000 c.p.s. but preferably in the range of 16,000 c.p.s. to 600,000 c.p.s. for continuous wave patterns, and in the range of 500 c.p.s. to 10 megacycles for pulsed wave patterns, either of which may be modulated over a select frequency band.

The $fId$ relationship is selected in that the low amplitude vibrations are applied for a period necessary to cause the micromassaging fatigue in the nerve receptors 26a and particularly the dendrites 28a involved, so that the nerve receptors involved are incapable, temporarily of reacting to stimuli which would normally trigger them into producing painful sensations.

The ultrasonic elastic waves of a compressional wave form are produced by the transducer 30a which is energized by an oscillation generator 32a, with a power cable 34a connecting the two together. The generator 32a, is an oscillator adapted to produce electrical energy having an ultrasonic frequency of either a continuous or pulsed wave pattern as explained with respect to FIG. 1. The transducer 30a and the generator 32a may be operated at both a fixed frequency or modulated over a defined frequency range. The specific oscillation generator 32a and transducer 30a for accomplishing the result may be conventional, and as such, a detailed description thereof need not be included in this disclosure since it is known to those skilled in the art. Ultrasonic systems are illustrated in U.S. Patents Re. 25,033, 3,100,853 and 3,196,333 which may be employed. The transducer 30a has a vibratory output surface or biosonic wall 36a which is maintained or positioned in the elastic medium 21a which may be a gas such as air in FIG. 3A, and when energized will transmit a series of coherent elastic energy waves 38a through the elastic medium 21a and into the portion of the body 16a to be irradiated as seen in FIG. 3A.

In the practice of this invention a frequency of vibration for the generator is selected for example at 150 kc./sec., and is frequency modulated over a 2,000 c.p.s. range to avoid persistent resonant effects in the organic substructures surrounding the nerve receptors. In this manner the elastic waves 38a vary between 149 kc. and 151 kc.

A note of importance in this field relates to the fact that the low frequency vibration range has found numerous biological applications. However, a perusal of the art will show that most of the effects produced have been due to the destructive properties of low frequency waves of high intensity. The destruction of cells and the preparation of serums and other useful destructive effects are attributable to the "cavitation" produced in the fluids in which the biological structures are immersed. The methods contemplated by this invention in analgesic treatment specifically avoids just this phenomenon of cavitation, and in fact, cooperating equipment monitored so that essentially non-cavitating coherent elastic waves of compression and rarefaction are introduced into the treatment area, containing the nerve receptors is utilized. The aim of the present invention is to use the elastic wave energy indicated for beneficial treatment purposes ranging all the way from a doctors office, handled by competent medical personnel to relieve or cure specific maladies, to home use.

It is also important to select elastic waves of a frequency range such that thermal absorption effects are held to a minimum. This means that in any homogeneous structure, the input elastic wave traverses the structure with only a small amount of conversion to thermal energy, such that the analgesic effects produced are due primarily to the micromassage treatment.

Thus, a general principle, related to the theory may be stated in terms of the Thermal Equivalence Principle. The principle asserts in effect that the kinetic energy of the basic particles of an aggregate may consist of both coherent and incoherent components and the coherent components are capable of producing effects similar to those produced by elevated temperatures, except that the coherent energy does not raise the temperature of the treated tissue and have any damaging effects therein. Thus, it is possible with coherent elastic wave energy to produce at room temperature results which normally require high temperature.

We therefore have the ability of treating a portion of the nervous system with coherent elastic wave energy, but which does not have any damaging effect on the nerve receptors or surrounding cells. In these cases there is the uniquely new feature, that at the equivalent high temperature range the nerve receptors would be destroyed and could not therefore exist thereafter. By utilizing coherent wave energy of either pulsed or continuous wave pattern as described herein this lethal temperature rise is avoided and it is possible to introduce greater levels of elastic energy into nerve centers and receptors than was ever before possible. In the high ultrasonic frequency range for example, very high intensity levels of elastic energy are used only when it is a question of performing ultrasonic surgery as in the destruction of cellular structures, but with the present method high intensity levels may be employed for healing purposes as well.

Thus, applicant's method may be likened to a technique for non-destructively entering live nerve receptors with elastic carrier waves and then with their "invisible elastic fingers" mechanically micromassaging and temporarily fatigue them for a given period of time. It is certainly obvious that just this technique alone reveals the extraordinary possibilities inherent in the broad coherent wave energy methods contemplated in the invention as applied as an analgesic agent.

The nerve receptors treated may be contained substantially in the outer layer of tissue 19a or substantially below it, by selecting the path at a proper intensity and frequency with an elastic medium in surrounding relation thereto.

The energy may be pulsed in a preselected pattern of pulses at spaced intervals of time to provide successive doses of energy to the nerve receptors. As explained with respect to FIG. 1 under "General Therapeutic Treatment," in which the coherent waves are pulsed for resting and/or heat dissipation.

In the lower frequency range the pulsed elastic wave energy is characterized in that when penetrating and traversing the organic structure a minimal quantity thereof is reflected and dissipated in the form of heat. Accordingly, the spaced time intervals are selected in relation to the time duration and intensity of the pulses to provide a resting period for the treated cellular structure between successive doses of the pulsed energy.

In the higher range the frequency is characterized in that when penetrating and traversing the organic structure there is a partial conversion of the pulsed coherent energy into thermal energy which conversion results in an elevation of the temperature of the treated cellular structure. Accordingly, in this range the pulses and intervals are selected to be of a compatible time duration to permit a dissipation of the heat between successive pulses so that the body temperature of the treated area remains at substantially a consant temperature level during treatment.

THERAPEUTIC TREATMENT OF CIRCULATORY SYSTEM AND CONTROL OF HAIR, SCALP, WEIGHT, ETC.

Coherent elastic wave energy can produce a number of phenomena, as coherent wave energy, besides the transformation of coherent to incoherent vibrations (which latter corresponds to internal heating). First of all, of course coherent wave energy produces an alternating stress or pressure in a medium. For compressional waves this means that at a given point the tissues present undergo periodic compression and extension (or push and pull, pressure and tension). This so-called micromassage may be applied to organic structures without excessive accompanying heat production.

Another therapeutic application arises in connection with the circulation of the blood in a given area. The stimulation of increased blood circulation in a given area promotes the health of the local tissues involved. This is how we get more rapid healing of wounds and the promotion of better health as in the case of gingival tisue. The $fId$ picture is different in this case, because among other things the conversion of some coherent to incoherent mechanical vibration energy, produces local heating, which, in turn can also assist in local blood circulation stimulation. Thus, one of the important factors in the use of ultrasonic energy with an $f$ in the megacycle range is just this circulation stimulation, such as is also obtained by diathermy. For $f$ in the megacycle range the $Id$ product must be selected such as to be well below periosteal pain production levels. As $f$ lowers, the $Id$ product for safe treatment without undue thermal effect may be increased and the $fId$ levels employed promote circulation as a chief aid in promoting healing.

There are at least three other basic systems of importance in the body and capable of treatment in accordance with the present and applicant's parent application. They are the bony skeletal structure, the lymph gland system and the endocrine (ductless) gland system, and the system of organs involved in the ordinary chemical factory of digestion and elimination. These include the sweat glands, the colon and small intestines, the lungs, the stomach, the kidneys, the liver, the gall bladder, etc.

There are also other mechanical effects of coherent wave energy. One is microstreaming or a kind of vibration pumping. This can cause the fluids in an organic structure to undergo local circulations, which are not present ordinarily. It is believed that effects of this sort affect the permability of cell membranes and thereby promote interchange of substances across boundaries. This relates to innumerable phenomena in the behavior of an organism.

In addition to micropumping effects, there is the possibility of cavitation which should not be ruled out in considering superficial actions of coherent wave energy, because a simple application of creams and ointments and the like can very well increase penetration of said medicaments. Also there is the very interesting effect which I call "causing a homeopathic dose of a medicament to become a therapeutic dose" in the presence of coherent wave energy. For example, a very weak solution of a chemical may become a really active agent when combined with coherent vibrations. Here, we are in the area of affecting the potency of a chemical agent in a biological structure by combining it with coherent wave energy.

Another application is the "shock" pulse treatment to hair or applying the waves in spaced relation to the follicle roots. By grasping hairs in bunches in an applicator it is possible to send pulses along the individual hairs to the follicle roots for stimulation and growth thereof. The dosage is selected for the patient if he desires removal of unwanted hair or stimulation and growth of wanted hair.

Another effect possible to the micromassage part of coherent wave energy is reducing fat such as is produced by exercising by properly controlling the variables discussed in reference to FIG. 1 for reducing (hips, buttocks, etc.). The apparatus employed may be of type employed in FIGS. 4A, 4B and 12.

So, I believe the stage is now completely set, whereby applicant has described the general principles adequately to show the proposed theory of the novel methods contemplated herein.

Figure 4A:
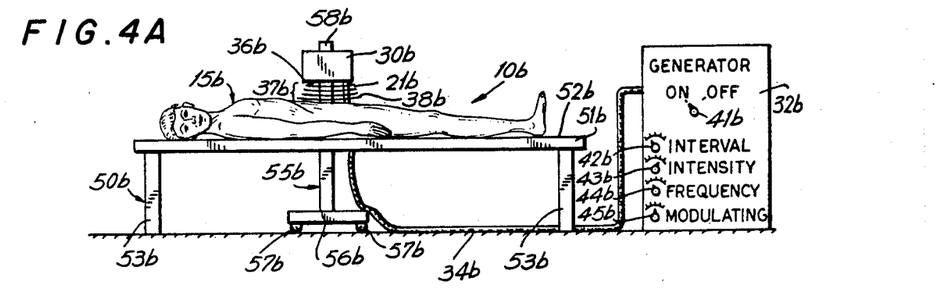
FIGS. 4A and 4B illustrate ultrasonic apparatus for treating a variety of the systems contained in the human anatomy.
Figure 4B:
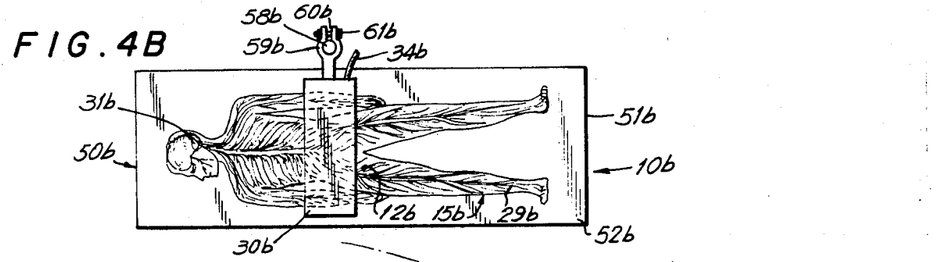

FIGS. 4A and 4B illustrate a form of the invention 10b for treating a biological organism or system 15b, for example a human, which includes support mean 50b for the biological organism. Since this invention permits the treatment of various portions or areas of the body, for different effects as to both general and particular therapeutic purposes, it is appreciated that the support means may take the form of a chair as in a dentist's office or particular structure for supporting only a portion of the body during the treatment period. In other instances the person may just stand adjacent the machine in the same manner as taking X-rays, and be supported by the floor. The physical characteristics of the support means 50b are also related to the properties of the elastic medium 21b through which the acoustic energy is transmitted, as illustrated in FIG. 4A the elastic medium is a gas i.e. air, but if the elastic medium is a liquid such as water, then the support means may be in the form of an enclosure as in FIG. 1.

The invention 10b in FIGS. 4A and 4B will first be illustrated with respect to treating the human body 15b, as shown with the nervous system 12b having a nerve center 31b and axons 29b, any part of which may be treated with ultrasonic coherent wave energy including the cell body not shown.

The support means includes a top 51b having an upper surface 52a and a plurality of vertical legs 53b which support the top. As explained above with reference to FIG. 1 the ultrasonic elastic waves 38b of a compressional wave form a path 37b which is produced by the transducer means 30b which is energized by an oscillation generator means 32b, with a power cable 34b connecting the two together. The operating frequency may be in the higher sonic or ultrasonic ranges.

Control means for intensity 43b, frequency 44b and modulation 45b are provided with the generator. Pulsing means 42b is also provided if the particular part of the nervous system requires it.

Positioning means 55b is provided to support the transducer means 30b in a variety of positions without necessitating changing of the position of the human 15b, and includes a base 56b with a plurality of casters 57b for ease of movement and a vertical leg 58b which extends therefrom for slidable engagement with bracket 59b (FIG. 4B) which is secured to the transdudcer means 30b in any conventional manner not shown. The bracket 59b is provided with a vertical bore for receiving the vertical leg 58b and is provided with a slot 60b having bolt means 61b extending therethrough to clamp the bracket in fixed position to the vertical leg 58b. It is appreciated that other mechanical means may be employed to produce the desired horizontal and vertical movement of the transducer means to treat the various portions of the body systems. The vertical spacing between the output surface or biosonic wall 36b which will transmit a series of coherent elastic energy waves 38b through the elastic medium 21b and into the human 15b is dependent on which part of a body system, for example the nervous system 12b, is to be treated.

Since we do not wish to destroy the nerve receptors in the biological organism but merely subject them to a degree of micromassage or flexure until a general anaesthesia sets in, the energy level of the elastic waves must also be within a frequency range such that the elastic waves 38b when penetrating the biological organism 15b generates a level of intensity generally below the cavitational threshold of the fluid medium therein.

Since this embodiment of the invention is illustrated with a human being, we have nerve complexes which have definite shapes, dimensions and distances below the skin. Acoustically each such substructure is like an acoustic auditorium within the main acoustic auditorium of the human body 51b. Through preliminary testing in a given case the linear length and depth from the skin structure in the direction of the waves is determined and the frequency and intensity compatible to such structure to obtain a general analgesia can be selected. The use of white noise and a panaramoscope have been found useful for such purposes. In this way it is possible to select appropriate bands of frequency for the frequency modulated energy to be introduced through the agency of the biosonic wall 36b.

In practice the transducer 30b is positioned over the portion of the organic structure 15b to be treated, as for example, the nervous system 12b, and a path 37b of coherent elastic energy waves is generated in spaced relation thereto and directed through the elastic medium contained therebetween for the transmission of the path of waves 38b to the selected portion to be treated. The frequency and intensity is selected to be compatible with the portion treated to obtain a micromassaging of the cellular structure as the energy penetrates pervasively into the acoustically accessible inner region of the portion treated. The coherent elastic energy waves may be pulsed in a preselected pattern of pulses at spaced intervals of time to provide successive doses of energy to the cellular structure.

The top 52b of the support means 50b acts as a reflecting surface so that the waves passing through the organic structure 15b may be reflected back therein to increase the utilization of the energy to irradiate the organic structure. In addition the waves may be modulated to produce a varying wavelength to prevent the formation of foci of energy within the organic structure.

The vibrations are transmitted for a period necessary to cause fatigue in the nerve receptors involved, whereby the nerve receptors involved are incapable of temporarily reacting to stimuli which would normally trigger them into producing painful sensations. At the higher frequencies (i.e. about 200 kc./sec.) it is desirable to construct the transdudcer means 30b using general optical principles so that a focusing action is possible. In this way pinpoint stimuli may be produced for selective applications to portions of the nervous system.

By way of example the human 15b may be treated with the ultrasonic analgesic method prior to an operation when it is either undesirable or medically unsound to give the patient a chemical analgesic. The time duration of non-responsiveness is dependent upon the dosage employed. For other patients the ultrasonic analgesic method may be first employed to place the nerve receptors in a condition whereby other analgesic aids such as an injection with a drug may be used.

The apparatus illustrated in FIGS. 4A and 4B, as well as in the other embodiments, lends itself for the treatment of various portions and/or systems comprising the human body and for which the micromassage treatment in either the continuous or pulsed form produces beneficial results. The various body systems as herein defined for this invention include at least the hair, skin, bones, muscles, brain, nerve, sensory, digestive, circulatory, respiratory, excretory and reproductive. A common theme for the treatment of all of the above is to monitor and control the various aspects of cell life including growth. By the irradiation of the cellular structure it is possible to obtain a micromassage thereof. Some of the more specific applications of the above systems are discussed herein, others will unfold as the total scope of the new and novel concepts disclosed herein are practiced.

Particularly the apparatus disclosed in FIGS. 4A and 4B may also be employed to treat the circulatory system to enhance the flow of blood therethrough by lowering of surface tension and altering the viscosity to permit an easier flow through restricted areas of the body including the heart, arteries, veins and capillaries. The output surface 36a of the transducer 30a is positioned in spaced relationship to the area of the body 15a to be treated. The path of waves 38a irradiate the blood to obtain a desired change and the frequency and intensity is selected to be compatible with the change desired. The application of the energy is continued for a treatment period of sufficient time to obtain the desired change in the treated blood.

In general, this is an application of applicant's principle of Thermal Equivalence. That is, the addition of coherent elastic wave energy produces effects equivalent to (i.e. without corresponding temperature rise) a rise in temperature. A very elementary application of the idea may be seen in pumping sand or some other finely divided solid composition. As soon as the sand (or composition) is vibrated it becomes "fluid like" and may be readily pumped around through conduits and the like just as liquids are. The pumping of powders has many uses today in many industries.

As to viscous liquids the introduction of high frequency vibration causes them to behave as if their viscosity were much lower. In the case of thixotropic substances the effect is especially dramatic, because an apparently hard mixture rapidly becomes soft, fluid-like and readily flows. This applies to blood clots within the circulatory system which may be treated with the coherent wave energy.

The detailed mechanism is probably fairly complex for individual cases but the basic principle is that mechanical vibration substitutes for a temperature rise, without bringing the possible deleterious effects of high temperature. This is of the essence in using ultrasonic energy in say, the blood stream in order to promote easier flowability by changing the viscosity. The vibrational energy may be looked upon as a kind of "lubricant" within the liquid itself. This idea of "lubrication" within a viscous liquid by means of ultrasonic vibration is, perhaps, an illuminating way of description.

Thus, we may postulate the phenomenon of "ultrasonic self-lubrication" of viscous liquids as a direct outcome of the Thermal Equivalence Principle. This unique use of aiding blood circulation is important in emergency heart conditions such as are encountered in acute phases of coronary heart disease. In accordance with the invention the heart and surrounding arteries are irradiated by the path of coherent wave energy to primarily promote flowability.

The micromassage treatment of the blood may also be used to change or alter the chemical composition of the blood as for treating diseases thereof. The wave energy may be continuous or pulsed in accordance with the theory of the present invention, in the range of 500 c.p.s. and 10 mc./sec.

Figures 5, 6, 7, 7A, 8, 8A:
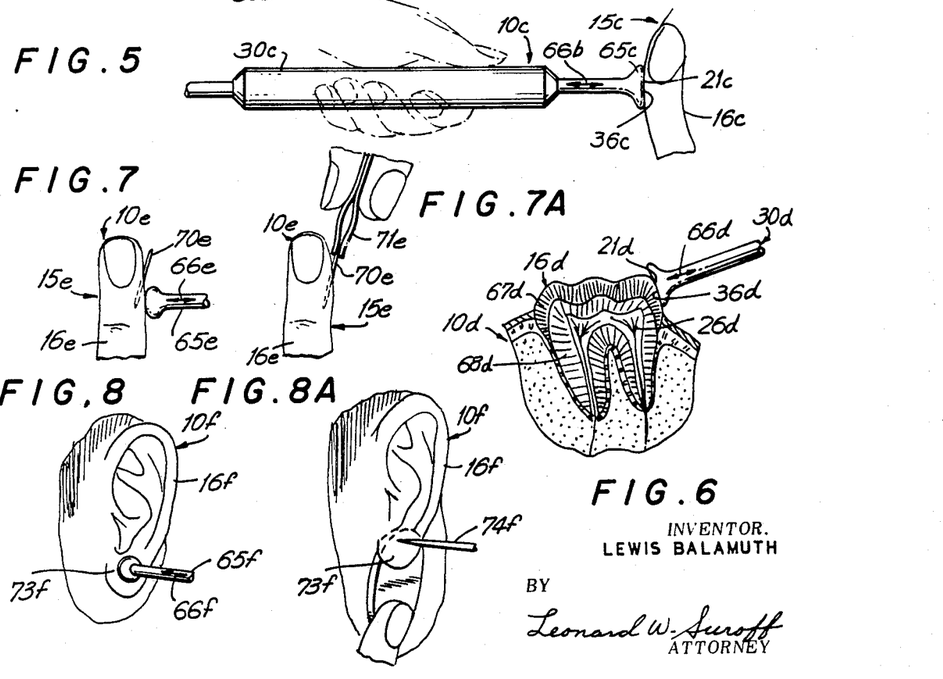
FIG. 5 illustrates a form of the invention in which the transducer is designed to be held in the hand for both internal and external treatment of the biological organism.
FIG. 6 illustrates the invention as an analgesic for treating teeth prior to conducting general dental practices thereon.
FIGS. 7 and 7A illustrate the invention in the removal of objects from the organism by first applying the ultrasonic analgesic to the surrounding area and then painlessly removing the object.
FIGS. 8 and 8A illustrate the treatment of a particular portion of the biological organism to obtain an analgesic effect prior to inserting a foreign object, such as a needle in the ear.

FIG. 5 illustrates a form of the invention 10c in which the energy waves are applied by a transducer 30c which is of a size and construction capable of being held by a hand for treating selective portions 16c, both internal and external, of a human 15c with a tool 65c having an output surface 36c. The transducer that may be employed to produce the longitudinal vibrations indicated by arrow 66c is well known in the art, as for example the devices illustrated in U.S. Patents 3,075,288 and 3,076,904. The tool output surface 36c may have a contoured configuration to conform to the area of treatment and to control the depth of penetration of the energy by providing a focused path by properly shaping the output surface. As illustrated, the body portion 16c is being treated after receiving a burn in which it is desired to first eliminate the pain and apply either a chemical analgesic and/or a medicament to the burned area, which would penetrate the burned area. An elastic medium 21c is first applied to the injured portion in the form of a salve which may also be the medication and the output surface 36c is brought into engagement with the elastic medium and the waves either continuous or pulsed are transmitted therethrough for a period necessary to irradiate and cause fatigue in the nerve receptors involved so that they are incapable, temporarily of reacting to the pain producing stimuli of the burned area.

FIG. 6 illustrates another embodiment of the present invention 10d, in which it is desired to perform dental work on the teeth without first applying a chemical analgesic or in which it is first desired to numb the surrounding gum structure preparatory to applying a chemical analgesic. In some dental procedures as when a tooth is impacted and requires extraction chemical analgesic cannot be safely applied, but with the ultrasonic analgesic procedure the vibratory energy can act on the nerve receptors in the manner described above. The biological substructure being a tooth 16d having outer layer of enamel 67d with an inner layer of dentin 68d and a pulp in which the nerve receptors 26d terminate.

To produce the analgesia of the tooth 16d the output surface 36d of the vibrator 30d is placed against the outer surface of the tooth 67d with an elastic medium 21d therebetween. The vibratory energy in the direction of arrow 66d may either be continuous wave or pulsed as explained above. The dentist depending upon the threshold of pain of the patient will select the proper frequency, intensity and pattern of the coherent wave energy to be applied to obtain the optimized results. The energy is applied for a period sufficient to obtain the analgesia of the tooth 67d. The vibrator may also be applied to the gum for the same purpose.

FIGS. 7 and 7A illustrate another embodiment 10e of the present invention when it is desired to remove a foreign object 70e, partially or fully embedded within a portion of the human, such as a finger 16e of the biological organism 15e. As seen in FIG. 7 the foreign object 70e is in the form of a splinter partially embedded within the finger 16e. Since the removal thereof is a painful experience a home ultrasonic analgesic unit may be utilized by placing the ultrasonic vibratory tool 65e adjacent the foreign object and vibrating the tool for a period of time and at a selected frequency pattern to fatigue the nerve cells.

As seen in FIG. 7A the extending portion of the splinter is securely gripped as by a pair of tweezers 71e, hand held and then pulled loose. In like manner the foreign object might be a bullet, buckshot, tack etc., that might be lodged in any area of the body. This ultrasonic analgesic application is most important in those areas of the body which do not lend themselves to a chemical analgesic, for example, the splinter 70e can readily be in the ear of the body.

Another application 10f of the present invention is illustrated in FIGS. 8 and 8A in which the portion 16f of the body treated is the human ear prior to piercing it. The vibratory tool 65f is applied against the ear lobe 73f for a period of time and at the proper frequency pattern and intensity to produce analgesia thereof. The ear lobe 73f is then supported as by support means and a pointed tool 74f is forced through the ear lobe 73f to obtain a pierced ear.

FIG. 9 illustrates an embodiment 10g in which the energy is applied to nerve receptors at a given depth below the skin. A vibratory tool 65g that has an output surface 36g which is contoured to apply the vibratory energy in a focused pattern for treatment of nerve receptors, or other systems, in exact locations and below the skin 19g of the treated biological organism 15g is employed. The energy waves converge at a point D which is selected in accordance with the to be treated group of nerve receptors.

FIG. 10 illustrates an embodiment 10h of the invention in which a focused energy vibratory tool 65h is used to induce a sense of painlessness in the nerve center 34h contained in the head 16h of the biological organism 15h in the form of an animal. Subsequent to rendering the animal immune to perceiving the pain impulses to the nerve center 34h, the slaughtering process is continued and the animal is killed in a conventional manner and as such the animal is substantially senseless to pain prior to slaughter.

Figure 11:
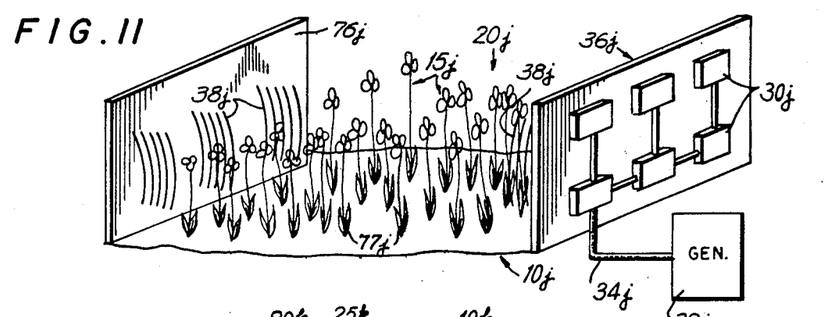
FIG. 11 illustrates a form of the invention used to treat plant life.

The pulse system of treating biological organisms is illustrated as applied to plants in FIG. 11, as another form 10j of the invention wherein the biosonic wall 36j is of sufficient size to treat large areas with the high frequency elastic waves 38j. A variety of organic elements 77j, such as trees and plants may be treated in open fields in which the acoustic auditorium 20j is formed by vertically maintaining a biosonic wall 36j in spaced relation to a second or reflecting wall 76j. A plurality of transducers 30j are coupled to the biosonic wall 36j and the cable joins them together and in turn connected to pulse generator 32j. The walls 36j and 76j are in spaced relationship to each other and may be anchored to the ground in any conventional manner not shown.

Figure 12:
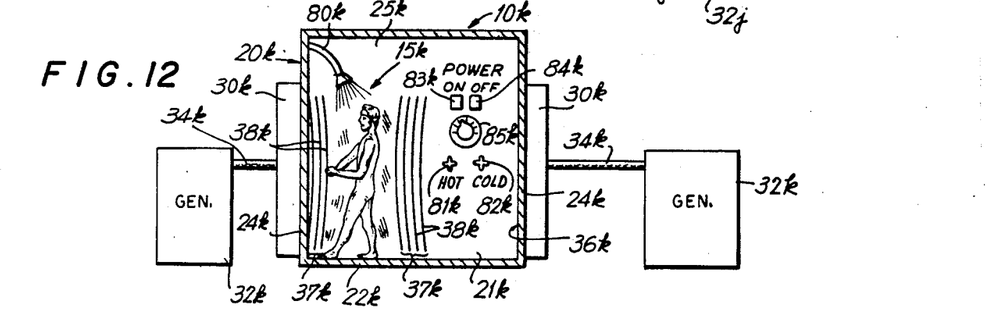
FIG. 12 illustrates the invention for treating humans and particularly two or more systems at one time.

FIG. 12 illustrates another form of the invention 10k that is particularly adapted for treatment of the circulation system and controlling the weight of the human body. A conventional method of controlling body weight is by exercize to "burn" up energy stored in the body. This method requires considerable time and effort and for certain individuals this method of weight control is impractical due to either a physical disorder, as a heart condition, or purely a matter of not having the time available. In any form of physical exercise the muscles of the body and in turn the cells undergo continuously applied tension and compressive forces during which time energy is consumed and "fuel" is brought to the cells by the blood stream.

For those people suffering from hardening of the arteries or heart conditions the pumping of the required blood through the circulation system is a difficult task alone, without the extra burden imposed by normal exercise.

Applicant has determined that the proper application of the coherent wave energy can bring about this exercize by a micromassage of the muscles, as well as the cells. The imposed compressive and tension forces in a sense duplicate the cell movement characteristic of normal exercize in a limited zone. In this manner by proper dosages of energy the body is stimulated to the extent of say running 5 miles every morning.

If desired the blood viscosity may be simultaneously altered by transmitting vibrations at the same or different frequency band. For example in many applications of this invention we will have a combination of two or more frequency bands utilized for treating a human at one time. Each frequency, intensity, etc. is selected to treat a particular system i.e. circulation and nervous system, circulation and muscle system. In addition the coherent wave energy at each frequency may be continuous, intermittent or pulsed, or a combination of continuous and pulsed. This may be accomplished by a first and second generating means including a plurality of transducers operating off of one or more generators.

Accordingly, the apparatus illustrated in FIGS. 1, 4A through 10, inclusive, may be employed for dual treatment of biological systems and may also be employed for treating the circulation, muscle and other related body systems discussed herein.

The acoustic auditorium 20k of FIG. 12 acts as a general purpose chamber for a plurality of uses and is illustrated as a shower to indicate that the weight reducing procedure might be carried on simultaneously therewith. The showering time may be used for having circulation problems treated as by reducing the viscosity of the blood, say for a 24 hour period. In like manner the tank of FIG. 1 acting as a bathtub may likewise be employed.

The acoustic auditorium 20k has spaced apart side walls 24k a rear wall 25k and support means in the form of a bottom 22k, forming a water proof enclosure with water supply means in the form of conduit 80k and controlled by valve means 81k for the hot water and valve means 82k for the cold water. The human 15k after entering the shower manually engages the switch means 83k to the "ON" position and causes one or both of the first and second generators 32k to operate. Current passes through cable 34k to the respective transducer means 30k associated with said first and second generator means. The transducers 30k are coupled to the shower walls 24k so that the latter will vibrate as a biosonic wall 36k and transmit a path 37k of energy waves 38k via the elastic medium 21k, primarily air, to the human 15k. Depending on the frequency, the coherent elastic waves which pass through the human are then reflected by the opposite wall 24k for a secondary treatment.

The two generating systems consisting of transducer means 30k and generator means 32k are provided to create a first path and second path respectively of coherent elastic wave energy for the therapeutic treatment of related portions of the body systems as defined herein.

In practice a frequency and intensity is selected that is compatible with the respective portions of the human 15k treated which for most applications the frequency along the first path will differ from the frequency along the second path. This dual treatment permits a micromassaging of the cellular structure of the first and second portions treated to obtain a related interaction between the portions for therapeutic treatment.

The elastic wave energy may be of a continuous or pulsed form. If continuous then it is important that the path is maintained at a level of intensity below the cavitational threshold of the fluid medium contained within the treated portion such that a minimal quantity thereof is reflected and dissipated in the form of heat within the human.

If one of said paths, or both, are of a pulsed wave form then the pulsing will be selected to permit resting periods to the cellular structure treated or periods to dissipate the heat as a result of the wave energy. The relationship of pulsing has been discussed under the theory of the invention and also pertains to simultaneous treatment with one or more paths of energy.

Accordingly, when the pulsed elastic wave energy has a frequency characterized in that when penetrating and traversing the organic structure a minimal quantity is reflected and dissipated in the form of heat, then the spaced intervals are selected in relation to the time duration of the pulses to provide a resting period for the treated cellular structure between successive pulses.

In contrast thereto, when the elastic wave energy penetrates and traverses the organic structure and there is a partial conversion of the pulsed coherent energy into thermal energy with an elevation of the temperature of the cellular structure, then the time interval between successive pulses is selected of a duration to permit a dissipation of the heat buildup within the treated cellular structure during the previously applied energy pulse. In this manner the body temperature of the treated area may remain at substantially a constant temperature.

The frequency and wave pattern, continuous and/or pulsed, of vibration of each generator may be controlled by the person taking the shower by adjusting the frequency control means having knobs 85k contained within the shower for the adjustment. The switching means and frequency control means are wired to the generators in any conventional manner. The frequency of vibration is preferably modulated over a given frequency range to prevent foci of energy in a given area and to be assured that the energy penetrates pervasively into the acoustically accessible inner regions of the body. Since the biosonic wall 36k is also of a large area various patterns of loops and nodes will appear, by varying the vibration pattern of the wall, stresses which might fatigue and crack the biosonic wall 36k are prevented. The "OFF" switching means 84k is activated when the person is done showering.

Although the vertical side walls 24k are generally illustrated as having the transducers coupled thereto, it is appreciated that the floor and ceiling are also walls of the acoustic chamber. Thus, the transducer may be mounted behind or beneath the ceiling or beneath the floor of the chamber since these are also walls within the defined invention.

Figure 13:
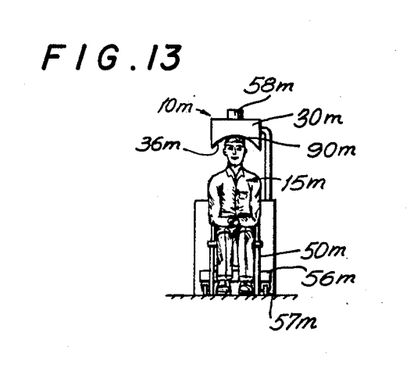
FIGS. 13 and 14 illustrate the invention as to the treatment of the hair and scalp portions thereof.
Figure 14:
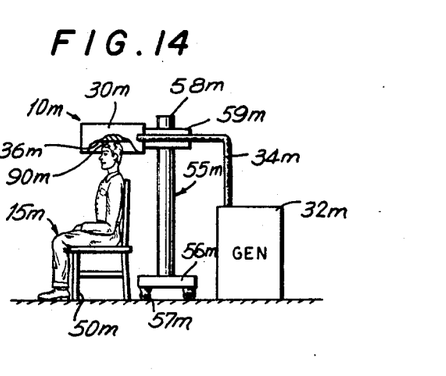

FIGS. 13 and 14 illustrate another embodiment 10m of the present invention adapted for treatment of the hair 90m of an organic structure 15m, particularly a human, to promote stimulation of the hair roots illustrated in FIG. 2F, and which may be contained on the scalp of the human under treatment. In treating the human he is placed on support means 50m in the form of a chair and the output surface 36m of the transducer 30m is positioned in spaced relationship to the scalp of the human.

Positioning means 55m is provided to support the transducer 30m in a variety of positions and accordingly includes a base 56m supported by a plurality of casters 57m. The vertical leg 58m extends from the base 56m for vertical adjustment with bracket 59m which is secured to the transducer 30m. The generator 32m is connected by the cable 34m to the transducer 30m which when energized produces a path of coherent elastic energy waves that may be either continuous or pulsed in a frequency range and intensity compatible with at least the portion of the hair roots treated.

Hairs are elongated fibres of definite elastic properties. Of course, thicker hairs will have different reactions to vibrations than thinner ones. Also, there is no specific frequency which could be "resonant" for all hairs because of the different dimension involved. In any case, if one wishes to stimulate hair by micromassaging, then it is necessary to transmit the energy to the hair roots which extend through the follicles. It is through the root attachment that substances are brought by the body to the hair, permitting its growth.

Ordinary massages, (low frequency devices) to condition the scalp and assist in stimulating blood circulation in the surrounding blood vessels and capillaries is well known. But, the use of very high frequency energy in pulsed form permits the transmission of non-heating doses of coherent wave energy to hair roots, and this new way of providing energy to hair roots has beneficial results both to the hair as well as the scalp. The frequency used can be in the multi-megacycle range when the energy is in pulsed form. Thus, although absorption occurs, the proper dosage-resting time will still permit safe doses of high frequency coherent wave energy to hair roots, with specialized stimulation resulting. The very high frequencies guarantee that the treatment is essentially "superficial." This is because of the high absorption coefficient, which would normally produce unwanted heating in deeper regions of the body.

Accordingly with the present invention it is possible to treat the hair of a human for therapeutic purposes by placing the hair in a path of coherent wave energy to irradiate the hair roots in the portion selected to be treated. The frequency and intensity is selected to be compatible with the hair roots treated. The frequency will generally range from as low as 500 c.p.s. to as high as 10 mc./sec. Coherent wave energy has the unique ability to provide the micromassaging treatment to maintain the scalp and hair healthy. The waves penetrate pervasively into the acoustically accessible inner region of the scalp and the depth of penetration is related to the frequency of vibration.

The applied energy may be in pulsed form in which case, depending upon the frequency, the period between and of each pulse may be selected to permit resting periods to the treated cellular structure or periods to dissipate the heat generated as a result of the wave energy.

Accordingly, when the pulsed elastic wave energy has a frequency characterized in that when penetrating and traversing the organic structure a minimal quantity is reflected and dissipated in the form of heat, then the spaced intervals are selected in relation to the time duration of the pulses to provide a resting period for the treated cellular structure between successive pulses.

In contrast thereto, when the elastic wave energy penetrates and traverses the organic structure and there is a partial conversion of the pulsed coherent energy into thermal energy with an elevation of the temperature of the cellular structure, then the time interval between successive pulses is selected of a duration to permit a dissipation of the heat buildup within the treated cellular structure during the previously applied energy pulse. In this manner the body temperature of the treated area may remain at substantially a constant temperature.

From the above disclosure, it is evident that the field of medical ultrasonics has been broadened to include the treatment of humans in a way never before believed possible by man. In accordance with this invention and that of applicant's parent patent application, the selective therapeutic treatment of various biological systems may be accomplished by providing a path of coherent elastic wave energy that pervasively penetrates into the internal depths of the human anatomy to treat a particular portion thereof and for a particular purpose. By pulsing the energy the cellular structure is given rest periods before being subjected to another dose of wave energy. When the frequency is selected in a range that causes a heating of the cellular structure then the rest periods are also employed to permit a dissipation of the heat before the next dose of energy is transmitted to the cells. It is contemplated that the biosonic wall may be large enough to treat a complete audience of people at one time or small enough to be inserted within the body for treatment of special diseases or conditions.

I claim:

1. A method of treating an inner region of an organic structure for therapeutic purposes, comprising the steps of
    (a) placing the organic structure in a path of coherent elastic wave energy for treating at least a portion of an inner region thereof,
    (b) selecting a frequency and intensity compatible with at least the portion thereof to be treated, said elastic wave has a frequency characterized in that when penetrating and traversing the organic structure, a quantity thereof is reflected and dissipated in the form of heat within the inner region of said organic structure,
    (c) micromassaging the cellular structure of at least the portion thereof being treated as said energy penetrates pervasively into the acoustically accessible inner region of the portion treated,
    (d) pulsing said coherent wave energy in a preselected pattern of pulses at spaced intervals of time to provide successive doses of energy to said cellular structure, and
    (e) selecting said spaced time intervals in relation to the time duration and intensity of said pulses to provide a period for the treated cellular structure between successive doses of said pulsed energy to remain free from damaging effects.

2. A method of treating an inner region of an organic structure for therapeutic purposes, comprising the steps of
    (a) placing the organic structure in a path of coherent elastic wave energy for treating at least a portion of an inner region thereof,
    (b) selecting a frequency and intensity compatible with at least the portion thereof to be treated, said elastic wave has a frequency characterized in that when penetrating and traversing the organic structure, a minimal quantity thereof is reflected and dissipated in the form of heat within said organic structure,
    (c) micromassaging the cellular structure of at least the portion thereof being treated as said energy penetrates pervasively into the acoustically accessible inner region of the portion treated,
    (d) pulsing said coherent wave energy in a preselected pattern of pulses at spaced intervals of time to provide successive doses of energy to said cellular structure, and
    (e) selecting said spaced time intervals in relation to the time duration and intensity of said pulses to provide a resting period for the treated cellular structure between successive doses of said pulsed energy.

3. A method as claimed in claim 2, further including the step of maintaining said pulsed elastic wave energy at a level of intensity below the cavitational threshold of the fluid medium within said cellular structure.

4. A method as claimed in claim 2, wherein said frequency of said pulsed coherent elastic wave energy is in the range of 500 c.p.s. and 600,000 c.p.s.

5. A method as claimed in claim 2, wherein said frequency of said pulsed coherent elastic wave energy is in the range of 16,000 c.p.s. and 100,000 c.p.s.

6. A method of treating an inner region of an organic structure for therapeutic purposes, comprising the steps of
 (a) placing the organic structure in a path of coherent elastic wave energy for treating at least a portion of an inner region thereof,
 (b) selecting a frequency and intensity compatible with at least the portion thereof to be treated, said elastic wave energy in said path has a frequency characterized in that when penetrating and traversing the organic structure there is a partial conversion of said coherent energy into thermal energy which conversion results in an elevation of the temperature of the treated cellular structure of the inner region,
 (c) micromassaging the cellular structure of at least the portion thereof being treated as said energy penetrates pervasively into the acoustically accessible inner region of the portion treated,
 (d) pulsing said coherent wave energy in a preselected pattern of pulses at spaced intervals of time to provide successive doses of energy to said cellular structure, and
 (e) selecting the time intervals between said successive pulses of a duration to permit a dissipation of the heat buildup within the treated cellular structure during the previously applied energy pulse, whereby the body temperature of the treated area remains substantially at a constant level during treatment.

7. A method as claimed in claim 6, wherein said frequency of said pulsed coherent elastic wave energy is in the range of 1 megacycle and 10 megacycles.

8. A method as claimed in claim 1, wherein the portion of the organic structure treated is selected from the body systems selected from the group consisting of the hair, skin, bone, muscle, brain, nervous, sensory, digestive, circulatory respiratory, excretory and reproductive.

9. A method as claimed in claim 1, further including the step of controlling the depth of penetration of said pulsed coherent wave energy beneath the surface of said organic structure for treating the particular portion thereof.

10. A method as claimed in claim 9, wherein said depth of penetration is controlled by providing a focused path of coherent wave energy to treat the selected localized portion of the organic structure.

11. A method as claimed in claim 1, wherein said pulsed elastic waves are generated over an area of sufficient size to substantially treat the entire organic structure at one time.

12. A method of treating an inner region of an organic structure for therapeutic purposes, comprising the steps of
 (a) supporting the organic structure for treating at least a portion of an inner region thereof,
 (b) generating a path of coherent elastic energy waves in spaced relation to said organic structure,
 (c) directing said path of coherent elastic energy waves in the direction of said portion to be treated,
 (d) providing an elastic medium between said organic structure and said source of coherent elastic energy waves for the transmission of said path of waves therethrough,
 (e) selecting a frequency and intensity compatible with at least the portion thereof to be treated, said elastic wave energy has a frequency characterized in that when penetrating and traversing the organic structure, a minimal quantity thereof is reflected and dissipated in the form of heat within said organic structure,
 (f) micromassaging the cellular structure of at least the portion thereof being treated as said energy penetrates pervasively into the acoustically accesible inner region of the portion treated,
 (g) pulsing said coherent wave energy in a preselected pattern of pulses at spaced intervals of time to provide successive doses of energy to said cellular structure, and
 (h) selecting said spaced time intervals in relation to the time duration and intensity of said pulses to provide a resting period for the treated cellular structure between successive doses of said pulsed energy.

13. A method as claimed in claim 12, wherein said intensity of elastic wave energy is at a level below the cavitational threshold of the fluid medium within said organic structure.

14. A method of treating an inner region of an organic structure for therapeutic purposes, comprising the steps of
 (a) supporting the organic structure for treating at least a portion of an inner region thereof,
 (b) generating a path of coherent elastic energy waves in spaced relation to said organic structure, said elastic wave energy in said path has a frequency characterized in that when penetrating and traversing the organic structure there is a partial conversion of said pulsed coherent energy into thermal energy which results in an elevation of the temperature of the treated cellular structure,
 (c) directing said path of coherent elastic energy waves in the direction of said portion to be treated,
 (d) providing an elastic medium between said organic structure and said source of coherent elastic energy waves for the transmission of said path of waves therethrough,
 (e) selecting a frequency and intensity compatible with at least the portion thereof to be treated,
 (f) micromassaging the cellular structure of at least the portion thereof being treated as said energy penetrates pervasively into the acoustically accessible inner region of the portion treated,
 (g) pulsing said coherent wave energy in a preselected pattern of pulses at spaced intervals of time to provide successive doses of energy to said cellular structure, and
 (h) selecting the time intervals between said successive pulses of a duration to permit a dissipation of the heat buildup within the treated cellular structure during the previously applied energy pulse, whereby the body temperature of the treated area remains substantially at a constant level during treatment.

15. A method as claimed in claim 12, wherein said elastic medium is a liquid.

16. A method as claimed in claim 12, wherein said elastic medium is a gas.

17. A method as claimed in claim 12, wherein said organic structure is a human.

18. A method as claimed in claim 12, further including the step of modulating the frequency of said pulsed energy waves over a selected frequency range to produce a varying wavelength to prevent the formation of foci of energy within the organic structure.

19. A method as claimed in claim 12, further including the step of reflecting said elastic waves after their passage through said organic structure to increase the utilization of said energy to irradiate said organic structure.

20. A method as claimed in claim 12, wherein said elastic medium is in the form of a medicament for penetration of the organic structure.

21. A method as claimed in claim 12, wherein said frequency, intensity and doses of coherent elastic wave energy is selected to apply said micromassaging treatment to effect a reduction of weight in said organic structure.

22. A method as claimed in claim 12, wherein said frequency, intensity and doses of coherent elastic wave energy is selected to apply said micromassaging treatment to the nervous system to obtain an analgesia of the treated portion thereof.

23. A method as claimed in claim 12, wherein said frequency, intensity and doses of coherent elastic wave energy is selected to apply said micromassaging treatment to the circulatory system to alter the blood therein.

24. A method as claimed in claim 12, wherein said frequency, intensity and doses of coherent elastic wave energy are selected to apply said micromassaging treatment to the hair roots.

25. A method of treating related portions of an organic structure for therapeutic purposes, comprising the steps of
 (a) placing the organic structure in a first path of coherent elastic wave energy for treating a first portion thereof,
 (b) selecting a frequency and intensity compatible with said first portion to be treated,
 (c) simultaneously placing the organic structure in a second path of coherent elastic wave energy for treating a related second portion thereof,
 (d) selecting a frequency and intensity compatible with said second portion to be treated, said frequency for treating said second portion being different from the frequency selected for treating said first portion, and
 (e) micromassaging the cellular structure of said first and second portions being treated to obtain a related interaction between said portions for therapeutic purposes.

26. A method as claimed in claim 25, wherein said coherent wave energy along said first and second paths are of a continuous wave form.

27. A method as claimed in claim 26, wherein said elastic wave energy along one of said paths is maintained at a level of intensity below the cavitational threshold of the fluid medium contained within said treated portion and a minimal quantity thereof is reflected and dissipated in the form of heat within said organic structure.

28. A method as claimed in claim 25, wherein said coherent wave energy along said first and second paths are of a pulsed wave form of a preselected pattern of pulses at spaced intervals of time.

29. A method as claimed in claim 25, wherein said coherent wave energy along one of said paths is in pulsed form with a preselected pattern of pulses at spaced intervals of time.

30. A method as claimed in claim 29, wherein
 (a) said pulsed elastic wave energy has a frequency characterized in that when penetrating and traversing the organic structure, a minimal quantity thereof is reflected and dissipated in the form of heat in said organic structure, and
 (b) said spaced intervals are selected in relation to the time duration of said pulses to provide a resting period for the treated cellular structure between successive pulses.

31. A method as claimed in claim 29, wherein
 (a) said pulsed elastic wave energy in said path has a frequency characterized in that when penetrating and traversing the organic structure there is a partial conversion of said pulsed coherent energy into thermal energy with an elevation of the temperature of cellular structure, and
 (b) further including the steps of selecting time intervals between successive pulses of a duration to permit a dissipation of the heat buildup within the treated cellular structure during the previously applied energy pulse, whereby the body temperature of the treated area remains substantially at a constant temperature level during treatment.

32. A method as claimed in claim 25, wherein said first and second selected portions include systems selected from the group consisting of hair, skin, bones, muscles, brain, nervous, sensory, digestive, circulatory, respiratory, excretory and reproductive.

33. A method as claimed in claim 25, further including the steps of
 (a) supporting said organic structure between said paths of coherent wave energy, and
 (b) providing an elastic medium for the propagation of said coherent wave energy to said organic structure.

34. A method of treating the blood in a circulatory system of a biological organism to obtain a viscosity change thereof, comprising the steps of
 (a) placing the circulatory system in a path of coherent elastic wave energy directed from a source of energy exteriorly of the biological organism and in spaced relation to the circulatory system to irradiate the blood in at least a portion thereof,
 (b) selecting a frequency and intensity compatible with the viscosity change desired to be obtained in the to be treated portion of the blood, and
 (c) continuing the application of said coherent elastic wave energy to irradiate the treated portion for a treatment period sufficient to obtain the desired viscosity change of the treated blood, whereby its circulation through the circulatory system is enhanced.

35. A method as claimed in claim 34, wherein the portion of the circulatory system treated is the heart to reduce the strain on the heart in instances of coronary heart disease.

36. A method as claimed in claim 34, wherein said treated blood is in the artery portion of the circulatory system.

37. A method as claimed in claim 34, wherein said treated blood is in the vein portion of the circulatory system.

38. A method as claimed in claim 34, wherein said treated blood is in the capillary portion of the circulatory system.

39. A method as claimed in claim 34, further including the step of pulsing said coherent wave energy in a preselected pattern of pulses within said treatment period to provide successive doses of energy to said blood.

40. A method as claimed in claim 39, wherein
 (a) said pulsed elastic wave energy has a frequency characterized in that when penetrating and traversing the blood, a minimal quantity thereof is reflected and dissipated in the form of heat therein, and
 (b) said spaced time intervals are selected in relation to the time duration and intensity of said pulses to provide a resting period for the treated blood between successive doses of said pulsed energy.

41. A method as claimed in claim 39, wherein
 (a) said pulsed elastic wave energy in said path has a frequency characterized in that when penetrating and traversing the blood there is a partial conversion of said pulsed coherent energy into thermal energy which conversion results in an elevation of the temperature of the treated blood, and
 (b) further including the step of selecting the time intervals between said successive pulses of a duration to permit a dissipation of the heat buildup within the blood, whereby the blood temperature of the treated area remains substantially at a constant temperature level during treatment.

42. A method as claimed in claim 39, wherein said frequency of said pulsed coherent elastic wave energy is in the range of 500 c.p.s. and 10 megacycles.

43. A method of treating the natural hair of a biological organism in situ for therapeutic purposes, comprising the steps of
(a) placing the hair in a path of coherent elastic wave energy to irradiate the hair roots in at least a portion thereof,
(b) selecting a frequency and intensity compatible with at least the portion of said hair roots to be treated, and
(c) micromassaging the hair roots of at least the portion thereof being treated as said energy penetrates pervasively into the acoustically accessable region of the portion treated.

44. A method as claimed in claim 43, wherein said treated hair is contained on the scalp of a human and said coherent wave energy is applied to stimulate the growth thereof.

45. A method as claimed in claim 43, further including the step of pulsing said coherent wave energy in a preselected pattern of pulses at spaced intervals of time to provide successive doses of energy to said hair roots and surrounding cellular structure.

46. A method as claimed in claim 45, wherein said pulsed elastic wave energy has a frequency characterized in that when penetrating and traversing the hair roots and surrounding cellular structure a minimal quantity thereof is reflected and dissipated in the form of heat therein.

47. A method as claimed in claim 46, wherein said frequency of said pulsed coherent elastic wave energy is in the range of 500 c.p.s. and 600,000 c.p.s.

48. A method as claimed in claim 45, wherein
(a) said pulsed elastic wave energy in said path has a frequency characterized in that when penetrating and traversing the human there is a partial conversion of said pulsed coherent energy into thermal energy which conversion results in an elevation of the temperature of the treated hair roots and cellular structure, and
(b) further including the step of selecting the time intervals between said successive pulses of a duration to permit a dissipation of the heat buildup within the treated hair roots and cellular structure during the previously applied energy pulse, whereby the temperature of the treated portion remains substantially at a constant temperature level during treatment.

49. A method as claimed in claim 48, wherein said frequency of said pulsed coherent elastic wave energy is in the range of 1 megacycle and 10 megacycles.

50. Apparatus for treating an organic structure for therapeutic purposes, comprising
(a) generating means for producing a path of coherent elastic energy waves at an ultrasonic frequency of vibration for treating at least a portion of the organic structure,
(b) support means for maintaining said organic structure in spaced relationship to said generating means and having an elastic medium therebetween through which said energy waves are propagated for therapeutic treatment of at least the portion thereof to be treated,
(c) control means associated with said generating means for selecting a frequency and intensity compatable with the portion being treated, and
(d) means for pulsing said energy waves to provide successive doses of energy to the portion being treated to obtain a micromasage of the cellular structure thereof.

51. Apparatus as claimed in claim 50, further including means associated with said generator means for modulating the frequency of said energy waves over a selected frequency range to produce a varying wave length to prevent the formation of foci of energy within the organic structure.

52. Apparatus as claimed in claim 50, further including means for adjusting the spacing between said organic structure and generating means.

53. Apparatus as claimed in claim 50, wherein said apparatus is adapted to treat one or more systems selected from the group consisting of the hair, skin, bones, muscles, brain, nerves, sensory, digestive, circulatory, respiratory, excretory and reproductive.

54. Apparatus as claimed in claim 50, wherein said generating means includes a hand held transducer having an output surface adapted to engage the elastic medium to transmit said vibrations to said organic structure.

55. Apparatus for treating an organic structure for therapeutic purposes, comprising
(a) first generating means for producing a path of coherent elastic energy waves at a selected ultrasonic frequency of vibration, for the treatment of a first selected portion of the organic structure,
(b) second generating means for producing a path of coherent elastic energy waves at a frequency different from said first selected frequency, for the simultaneous treatment of a second selected portion of the organic structure,
(c) support means for maintaining said organic structure in spaced relationship to said first and second generating means and having an elastic medium therebetween through which said energy waves are propagated for simultaneous treatment of said selected portions, and
(d) control means associated with said generating means for selecting a frequency and intensity compatable with said respective first and second portions being treated.

56. Apparatus as claimed in claim 55, further including means for pulsing the waves produced by at least one of said generating means.

References Cited

UNITED STATES PATENTS

| | | | |
|---|---|---|---|
| 2,828,114 | 3/1958 | Raudszus | 134—184 XR |
| 2,970,073 | 1/1961 | Prange | 134—1 |
| 3,251,219 | 5/1966 | Hertz et al. | |
| 3,308,652 | 3/1967 | Appel et al. | |
| 3,318,578 | 5/1967 | Branson | 134—1 XR |
| 3,352,303 | 11/1967 | Delaney | 128—24 |
| 3,355,755 | 12/1967 | Brooks | 134—1 XR |
| 3,358,677 | 12/1967 | Sheldon | 128—24 |

FOREIGN PATENTS

| | | |
|---|---|---|
| 887,670 | 7/1943 | France. |
| 824,683 | 12/1951 | Germany. |

L. W. TRAPP, Primary Examiner

U.S. Cl. X.R.

47—1.3; 128—303